UNITED STATES PATENT OFFICE.

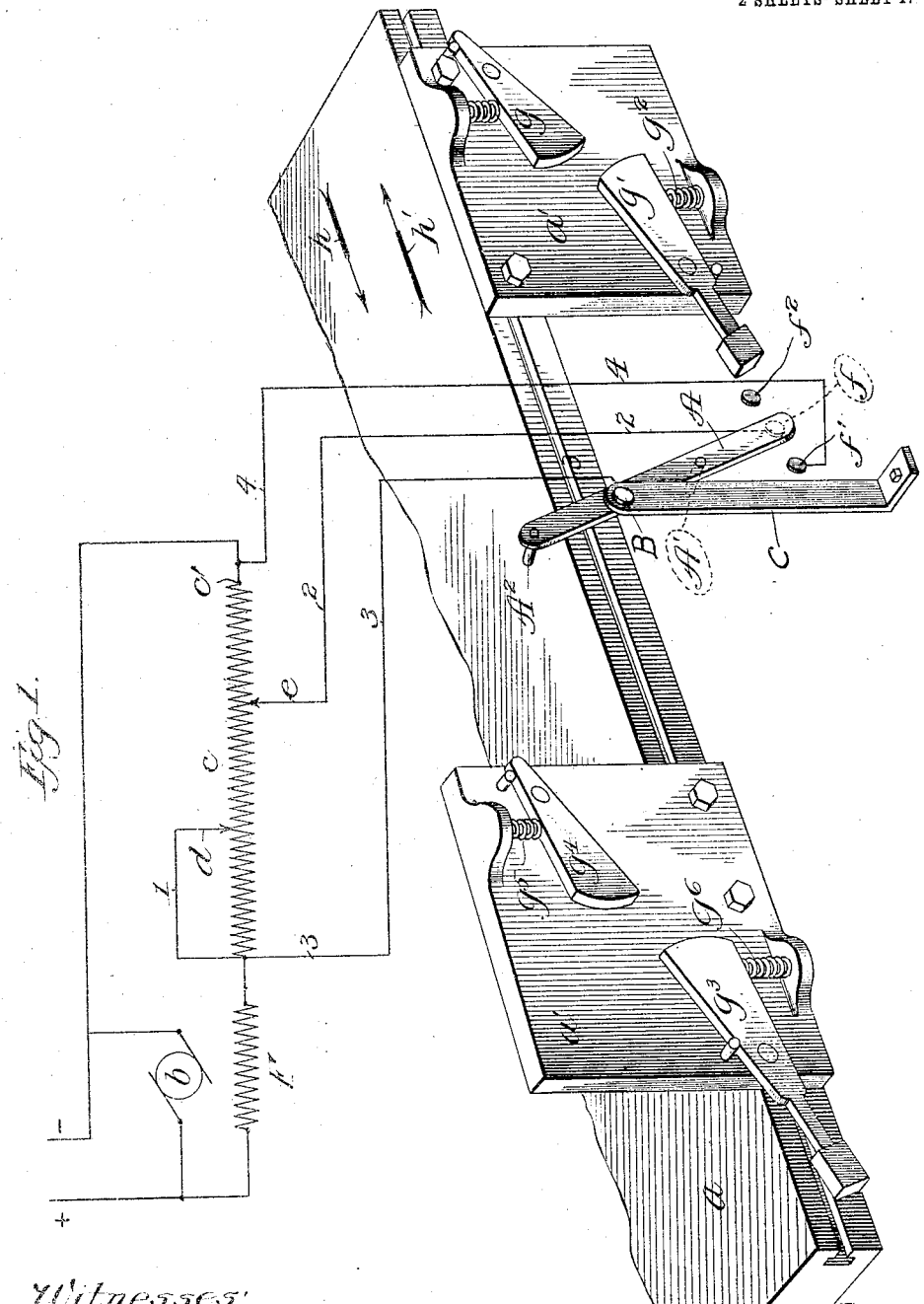

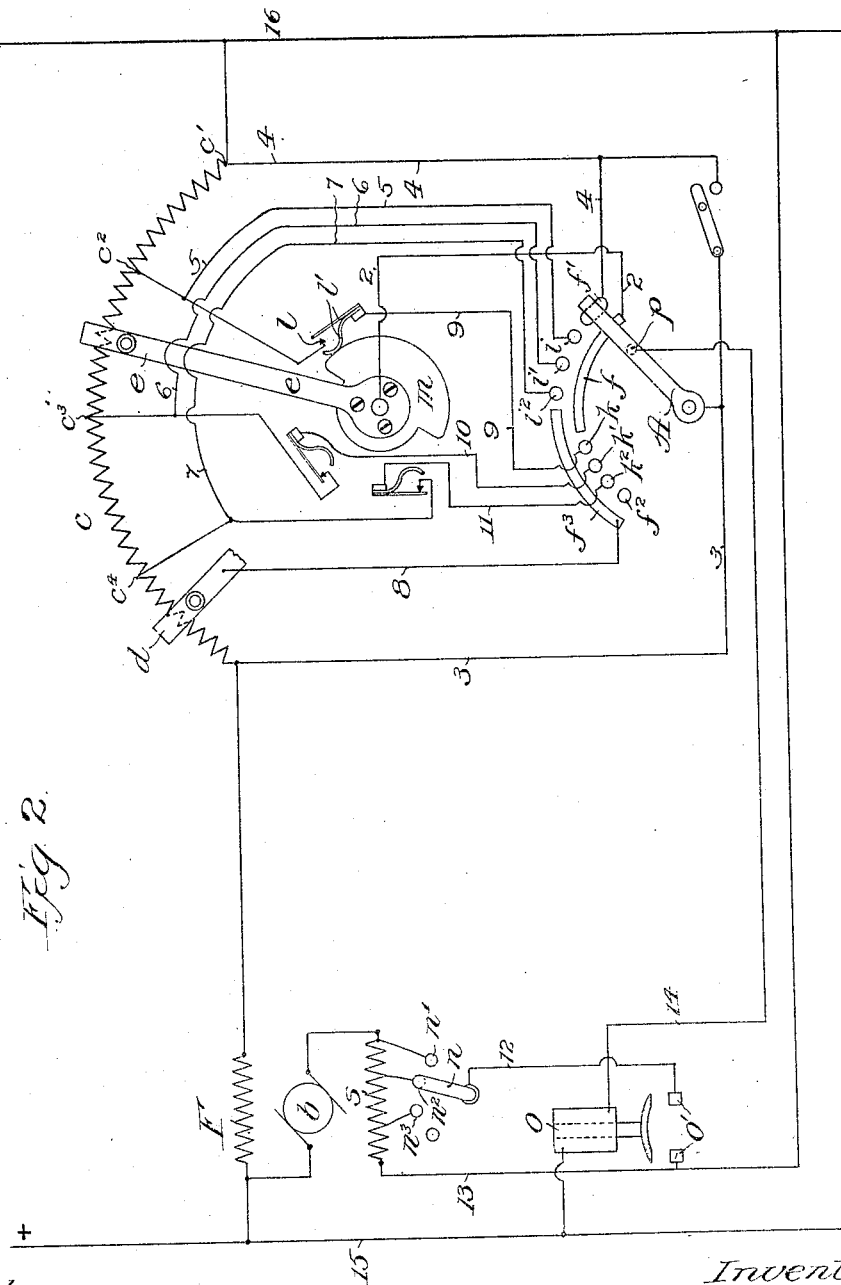

ALEXANDER D. DU BOIS, OF CHICAGO, ILLINOIS, ASSIGNOR, BY MESNE ASSIGNMENTS, TO GENERAL ELECTRIC COMPANY, A CORPORATION OF NEW YORK.

VARIABLE-SPEED ELECTRIC DRIVE FOR PLANERS.

1,057,045.  Specification of Letters Patent.  Patented Mar. 25, 1913.

Application filed January 13, 1906. Serial No. 295,840.

*To all whom it may concern:*

Be it known that I, ALEXANDER D. DU BOIS, citizen of the United States, residing at Chicago, in the county of Cook and State of Illinois, have invented a certain new and useful Improvement in Variable - Speed Electric Drives for Planers, of which the following is a full, clear, concise, and exact description.

My invention relates to a system of speed control for motor driven planers or other machines having a reciprocating motion.

It is generally known that in the operation of planing machines it is desirable to maintain the greatest practicable speed of return stroke or backward travel of the platen in order to reduce the time of the unproductive part of the operation of the planer to a minimum. To this end the common practice with belt driven planers has been to so gear the machine that the speed of return stroke will be constant and at its maximum permissible value at all times when the planer is in operation, the speed of return stroke being considerably higher than the speed of the cutting stroke. The cutting speed of course should be capable of variation, and for this reason the motor driven planer should be operated by a variable speed motor. Heretofore the difficulty of using a variable speed motor for driving planers has been due to the fact that a variation of the motor speed during the cutting stroke would cause a change in the speed of the return stroke. It has therefore been the practice to use a constant speed motor in combination with change gears for obtaining several cutting speeds, the platen during the return stroke being driven directly through an unchangeable train of gears. This arrangement is unsatisfactory, since the speed steps obtainable with gears are coarse, and the means of obtaining them cumbersome and uneconomical of time.

The purpose of my invention is to provide means whereby a variable speed motor running always in the same direction can be applied to a planer and automatically controlled by the operation thereof in such a manner as to make the speed of cutting stroke entirely independent of the speed of return stroke, while either or both can be varied at the will of the operator. I am thus enabled to make the speed of the return stroke as great as practicable without affecting the speed of the cutting stroke, which may be varied from a low to a high speed according to the work to be done during such stroke, and without regard to the speed of the return stroke.

Generally speaking, my invention contemplates the use of a non-reversible electric motor for driving the planer or other reciprocating device, a resistance being included in the field circuit of the motor. Independent means are provided for determining the amounts of said resistance to be inserted in the field circuit during the forward and return strokes, respectively, of the platen of the planer, to obtain different speeds for the strokes. The planer, at the end of the cutting stroke, is adapted to effect the introduction into the field circuit of the predetermined amount of resistance which determines the speed of the return stroke, and said planer, at the end of its return stroke, automatically causes the predetermined amount of resistance, which determines the speed of the cutting stroke, to be inserted into the field circuit. Thus with the motor running continuously in one direction, the planer serves automatically at each reversal to change the motor speed by the interpolation into the circuit of one or the other of said amounts of field resistance, to drive the machine at one speed during the cut and at another speed on the return stroke.

I will describe my invention particularly by reference to the accompanying drawings, which illustrate the preferred embodiment thereof, reserving for the appended claims a statement of the parts, improvements and combinations which I consider novel with me.

In the drawings, Figure 1 is a diagrammatic view representing the application of my invention to the platen of a planing machine; and Fig. 2 is a diagrammatic view illustrating a modification thereof.

The same letters of reference designate the same parts wherever shown.

Referring first to Fig. 1, I will describe the application of my invention, in its simplest form, to a planing machine. The platen *a* of a planer is adapted to be driven by a variable speed, non-reversible electric motor $b$, and may be reciprocated by a suitable gearing interposed between the shaft of the motor and the platen in any manner well known in the art. The field resistance $c$ is included in series with the shunt field F of the motor $b$, and is provided with the movable contact arm $d$ connected by a conductor 1 with the conductor connecting the shunt field with resistance $c$, said arm $d$ being adapted to be manually set at any desired position along the resistance $c$ to determine the amount thereof to be included in the field circuit during the return stroke of the platen, as will be hereinafter described. A similar contact arm $e$ is provided for the resistance, which is also adapted to be manually set at any desired position along the same to determine the resistance to be inserted in the field circuit during the cutting stroke. The arms $d$, $e$, together with the resistance $c$, illustrate diagrammatically a well-known form of manually operated rheostat.

The arm $e$ is connected by a conductor 2 with the contact $f$ of a switch arm A, said arm being connected by a conductor 3 with the field circuit between the field F and the resistance $c$. The contact $f'$ of the arm A is connected by a conductor 4 with the field circuit on the side of the resistance $c$ opposite the field F. When the arm A is on its contact $f$, the portion of the resistance between the arm $e$ and the end $c'$ of the resistance is included in the field circuit to obtain the speed desired for the cutting stroke of the planer. When the arm A is on the contact $f'$ the entire resistance $c$ is short circuited, and the motor running with its full field strength, and when the arm A is on its dead contact $f^2$, the portion of the resistance $c$ between the arm $d$ and the point $c'$ is included in the field circuit to obtain the speed for the return stroke of the planer, the remaining portion of the resistance being short circuited by a conductor 1. Thus the arm A, with its contacts $f'$ and $f^2$, comprises a switch which is adapted to bring about the insertion of the predetermined amount of field resistance for the cutting and return strokes. Said switch arm may be pivoted at B upon a support C suitably fastened to the frame of the planer, adjacent to the moving platen $a$ and arranged to be operated by the two pairs of pivoted actuating dogs $g$, $g'$ and $g^3$, $g^4$. $g^5$ and $g^6$ indicate springs which press the dogs $g^3$ and $g^4$ against their stops. The platen $a$ carries at its right end the pair of dogs $g$, $g'$, respectively. As the platen $a$ approaches the end of its cutting stroke, traveling in the direction shown by the arrow $h$, the centrally pivoted switch arm A being upon its contact $f$ to insert the resistance determined by the arm $e$ into the field circuit, a pin A' carried upon the lower portion of the lever or switch arm A rides over the inclined side of the dog $g'$, depressing the same against the tension of the spring $g^2$ of said dog, and is engaged by the end of the dog $g$, whereupon the arm A is rocked into engagement with its contact $f'$, thereby short circuiting the entire resistance $c$. When the arm reaches contact $f'$ the lowest point of dog $g$ passes beyond pin A'. The motor is now given its full field strength and is running under conditions of maximum torque and maximum stability of magnetic field, which latter is desirable in order to prevent sparking. While the motor is running under these conditions, the motion of the platen $a$ is automatically reversed in the usual manner and the platen commences its return stroke. As the platen starts on its return stroke, traveling in the direction indicated by the arrow $h'$, the dog $g$ again passes over the pin A' without operating the lever A, and the end of the dog $g'$ engages the pin A' and moves the arm A over the contact $f$ and into engagement with its dead contact $f^2$, thereby inserting into the field contact the resistance determined by the arm $d$, that is, the resistance between arm $d$ and the point $c'$. The connections remain undisturbed during the return stroke of the platen, and the motor is now running at a speed greater than its speed on the cutting stroke (unless it has been set for the same speed as the speed of the cutting stroke by moving the arm $d$ opposite arm $e$).

The platen carries at its opposite or left end the other pair of dogs $g^3$, $g^4$, respectively, and as the platen approaches the end of its return stroke the pin A² carried upon the upper end of the switch arm A passes under dog $g^4$ without touching it, but engages the end of dog $g^3$ which shifts the arm A into engagement with its contact $f'$, thereby short circuiting the resistance $c$ and giving the motor its full field strength again. When the arm A has reached contact $f'$ it is in position to allow the dog $g^3$ to pass under the pin A². The platen continues its stroke for a short distance until it is again reversed in the usual manner and starts back on its cutting stroke. The dog $g^3$ again passes under the pin A² but the end of the dog $g^4$ engages said pin and the arm A is again shifted to its contact $f$, thereby introducing into the field circuit the resistance determined by the arm $e$ for the cutting stroke. The dog $g^4$ will now pass over the pin A², and the platen will continue its cutting stroke with the portion of the resistance $e$ to $e'$ included in the field circuit of the motor.

I do not desire to be understood as limiting myself to the means which I have shown for shifting the position of the switch arm A, since any form of trips may be employed for automatically actuating the switch in the movement of the platen. Each set of dogs may be mounted upon a suitable support $a'$ slidably mounted upon the platen $a$ and adapted to be secured in the positions corresponding to the length of stroke to which the platen has been adjusted.

Referring now to Fig. 2, I will describe a modified form of my invention which provides for gradually cutting into the field circuit the predetermined amounts of resistance for both the cutting and return strokes. The arms $d$ and $e$ are preferably mounted upon the same shaft but insulated from each other. These arms correspond to the arms $d$ and $e$, respectively, of Fig. 1 and are adapted to be set manually to determine the proper amounts of resistance to be inserted in the field circuit for both the cutting and return strokes. The arm $d$ is shown broken off, merely for the sake of clearness. The switch arm A corresponds to the arm A of Fig. 1, and is adapted to be operated in the same manner. Said arm is adapted to be moved over a series of contacts to be hereinafter described, placed intermediate the main contacts indicated by the dotted lines. As shown in the drawing, the arm A is resting upon its contact $f'$ so that the entire field resistance is short circuited by conductors 3, 4, which include the arm A and its contact $f'$. The arm A also rests upon the contact $f$, which, as shown, is an extended segment, and above said segment are provided contacts $i$, $i'$, $i^2$, which are connected by conductors 5, 6, 7, with different points $c^2$, $c^3$, $c^4$, respectively, of resistance $c$. With this arrangement the resistance between arm $e$ and point $c'$, which is to be inserted in the field circuit to determine the speed of the cutting stroke must be gradually inserted in the circuit, since the arm A in traveling over the segment $f$ and the contacts $i$, $i'$, $i^2$, opens short circuits 5, 6, 7, in sequence about the portions of the resistance $c$ until the amount determined upon by the arm $e$ is inserted in the field circuit. Thus with the arm $e$ set to the position shown, as soon as the switch lever A passes the contact $i$ it opens short circuit 5, and includes the resistance between the arm $e$ and point $c'$ in the field circuit, and when the switch lever A is moved back to contact $f'$ the resistance is gradually cut out.

When the switch lever A is shifted from its contact $f'$ to insert the resistance into the field circuit for the return stroke, it engages, in addition to the contact $f^3$ connected by conductor 8 with the arm $d$ in sequence, three contacts $k$, $k'$, $k^2$, which are connected by conductors 9, 10, 11 with the points $c^2$, $c^3$, $c^4$, respectively, above referred to, of the resistance $c$, so that the predetermined resistance for the return stroke, that is, the resistance between arm $d$ and the point $c'$ will be gradually inserted in the field circuit. Said switch lever, in engaging said contacts, sequentially short circuits gradually decreasing portions of the resistance $c$ until the proper amount has been interpolated into the field circuit.

It will be noted that due to the position of the arm $e$ a certain portion of the resistance for the return stroke will have been already inserted in the circuit when the arm A reaches the contacts $f$, $f^3$ in the path by way of contact $f$, arm $e$ to point $e'$; the amount of such resistance being dependent, of course, upon the position of the arm $e$. In order to prevent any re-strengthening of the field by closure of the short circuits 9, 10 and 11, which might be closed about portions of the resistance $c$ between the arm $e$ and the point $c'$, I provide in each of said conductors a switch $l$, which is adapted to be operated by a cam $m$ mounted upon the shaft carrying arm $e$. The cam thus severs the continuity of any of the conductors 9, 10, 11, whose points of connection with resistance $c$ are between the arm $e$ and point $c'$ of said resistance. Thus with the arm $e$ in the position shown in Fig. 2, the switch $l$ of conductor 9 will be operated by the cam to open such conductor, preventing the short circuiting of the portion of the resistance between the arm $e$ and the point $c'$ during the operation of gradually weakening the field for the return stroke. Each switch $l$ is adapted to be operated by a spring member $l'$ which is adapted to be engaged by the cam to separate the members of said switch. The cam $m$ is electrically connected with the arm $e$, and the spring $l'$ of each switch is connected with the member thereof directly connected with its contact associated with the arm A. Thus with the condition shown when the arm A reaches contact $k$, instead of short circuiting a portion of the resistance between arm $e$ and point $c'$ by conductor 9, a path for the current will be provided by way of conductor 9, spring $l'$, cam $m$ and arm $e$, so that the portion of the resistance between the arm $e$ and the point $c'$ is left in the field circuit while the arm A travels from its contact $f$ over contact $k$ until it reaches contact $k'$, and the portion of the resistance $c$ between points $c^3$, $c'$, is inserted. When the arm A reaches its dead contact $f^2$, it is still in engagement with contact $f^3$, and the predetermined resistance between arm $d$ and point $c'$ of the field resistance is inserted in the field circuit for the return stroke, the conductors 3, 8, short circuiting the remaining portion of the resistance.

Where compound wound motors are used with my system, I provide means whereby the series field winding may be utilized to produce a condition of greater torque at the end of each stroke of the platen. To this end I employ a manual switch lever $n$ having contact points $n'$, $n^2$, $n^3$, connected to different points along the series field $s$, said switch arm *n* being connected by conductor 12 through contacts *o'* controlled by a solenoid *o*, with the main conductor 13, including the series field winding. The contacts *o'* are adapted to be closed by the solenoid when inert, and thereby short circuit any desired portion of the series field, according to the contact which the switch arm *n* rests upon. The solenoid *o* is included in a conductor 14 extending from the line wire 15 to a contact *p*, against which the switch arm A rests in engagement with its contact *f'*, which is connected through conductor 4 with the opposite line wire 16. Thus when the arm A is upon its contact *f'*, the field resistance *c* is short circuited, and the shunt field given full strength. At the same time the switch lever A engages the contact *p* and completes a circuit between conductors 15, 16 for the solenoid *o*, which separates the contacts *o'*, withdrawing the short circuit from the predetermined portion of the series field so that the motor is running with full series field strength and full shunt field strength. This condition would occur as the platen approached either limit of its movement, and was about to reverse its direction. When the arm A is in engagement with its contacts $f^2$, $f^3$ to insert the predetermined resistance in the shunt field for the return stroke of the platen, the circuit of the solenoid *o* is interrupted, and the contacts *o'* closed, whereupon the predetermined portion of the series field is short circuited, and the motor running upon a weakened series and shunt field, giving a high speed for the return stroke. Thus at the instant of reversal of the platen, the motor is running as a heavily compounded motor, while during either stroke of the platen the motor is running either as a shunt motor or as a lightly compounded motor, according to the position of arm *n*. By this means I gain the advantage of the heavily compounded motor during the periods of heaviest load, and the advantage of the good speed regulation of the shunt or lightly compounded motor during the cutting stroke.

I claim:

1. The combination with a reciprocating device, of an electric motor for driving the same, a field resistance for the motor, contact arms independent of each other for determining the amounts of said resistance to be inserted in the forward and backward strokes of said device, a switch operated by said device, and connections whereby said switch short circuits the whole field resistance at the end of each stroke and short circuits a portion thereof determined by the position of the contact arms at the beginning of each stroke.

2. The combination with a reciprocating device, of an electric motor for driving the same, a field resistance for the motor, and contact arms movable independently of each other for determining the amount of said resistance to be inserted in the field circuit during the forward and backward strokes of said device, a switch for said resistance, and connections whereby the switch short circuits the whole field resistance in one position of the device and portions of the resistance determined by the position of the contact arms in other positions of the device.

3. The combination with a reciprocating device, of an electric motor for driving the same, a field resistance for the motor, contact arms independent of each other for determining the amounts of said resistance to be inserted in the field circuit during the forward and backward strokes of said device, a rocking switch lever and contacts therefor, and actuating dogs carried at opposite ends of said device for shifting said lever over its contacts to alternately insert said predetermined amounts of field resistance into the field circuits during the strokes of said device.

In witness whereof, I, hereunto subscribe my name this 11th day of January A. D., 1906.

ALEXANDER D. DU BOIS.

Witnesses:
 Roy T. Alloway,
 Bert Starr York.